Figure 1:
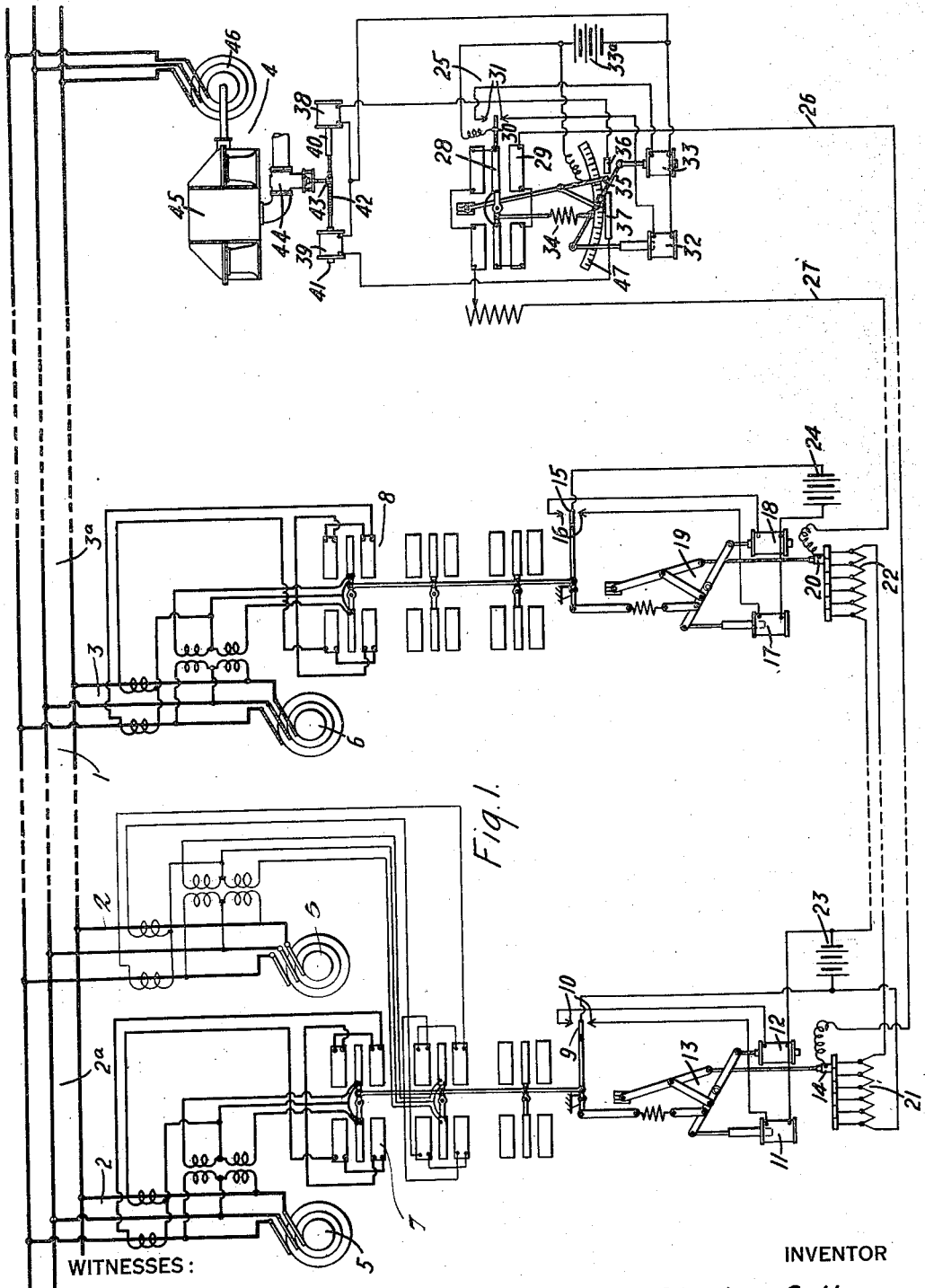

Patented Mar. 13, 1923.

1,448,402

UNITED STATES PATENT OFFICE.

STEPHEN Q. HAYES, OF PITTSBURGH, PENNSYLVANIA, ASSIGNOR TO WESTINGHOUSE ELECTRIC AND MANUFACTURING COMPANY, A CORPORATION OF PENNSYLVANIA.

MEASURING SYSTEM.

Application filed June 5, 1916. Serial No. 101,734.

*To all whom it may concern:*

Be it known that I, STEPHEN Q. HAYES, a citizen of the United States, and a resident of Pittsburgh, in the county of Allegheny and State of Pennsylvania, have invented a new and useful Improvement in Measuring Systems, of which the following is a specification.

My invention relates to measuring systems and particularly to means for totalizing the power that is supplied to a circuit from a plurality of widely distributed sources of energy.

The object of my invention is to provide a totalizing device that shall be adapted to be actuated in accordance with the total indications of a plurality of devices.

United States Patent No. 1,234,865, issued July 31, 1917, to Harold W. Brown and assigned to the Westinghouse Electric and Manufacturing Company, discloses a load-regulating system that comprises means for supplementing the energy that is supplied to a circuit from an auxiliary source of energy when the load on the circuit reaches a predetermined value. In such systems, the main sources of supply have sometimes been located a relatively great distance apart and have not all been connected to the same load circuit. Hence, it has been found difficult to determine, at any one point, the total value of energy that was supplied by the main sources. Consequently, it was difficult to control the auxiliary source of energy in accordance with the total load that was supplied by the main sources of energy.

In view of the conditions stated above, I provide meters for measuring the power that is supplied by the main sources of energy and I further provide a variable-resistance resistor for each of the meters. The resistors are connected in series relation with respect to a battery, and contact members are adapted to be moved along the resistors in accordance with the power traversing the meters. An electro-responsive device is electrically connected to the contact members and is thus supplied with energy in accordance with the sum of the potential drops across a portion of each of the resistors, or, in other words, in accordance with the sum of the indications of the meters. The electro-responsive device may be adapted to control the valves or the governor of a steam turbine or may indicate the totalized energy that is supplied by the two widely distributed sources of energy.

Figure 2:
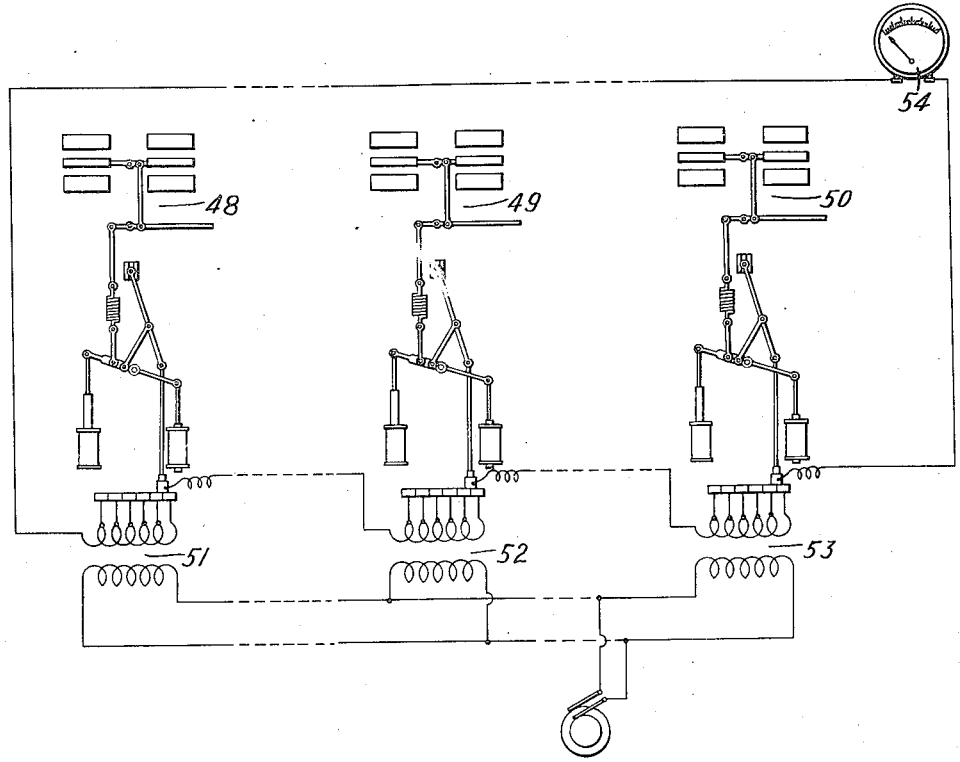

Fig. 1 of the accompanying drawing is a diagrammatic view of a distributing system embodying my invention, and Fig. 2 is a diagrammatic view of a modified system embodying my invention.

In Fig. 1 of the drawings, the system in connection with which my invention may be used comprises a three-phase distributing circuit 1 to which energy is supplied at two main points 2 and 3 and is adapted to receive energy from an auxiliary source 4 of energy when the total energy that is supplied at the points 2 and 3 reaches a predetermined value. Energy is supplied at the point 2 from a generator 5 and at the point 3 from a generator 6. However, any number of generators may be used to supply energy at the points 2 and 3, and the portions $2^a$ and $3^a$ of the circuit 1 may or may not be connected in parallel to the same load. That is, each generator may supply energy to an independent load circuit. The points 2 and 3 are located a relatively great distance apart and, consequently, some means must be provided for indicating, at a single point, the total power that is supplied by the generators 5 and 6.

A wattmeter 7 is operatively connected to the conductors of the generator 5, and a similar wattmeter 8 is operatively connected to the conductors of the generator 6. The wattmeters 7 and 8 may be constructed in accordance with the wattmeter shown in United States Patent No. 1,289,503, issued December 31, 1918, to Paul MacGahan and assigned to the Westinghouse Electric and Manufacturing Company, and may have any number of units in accordance with the number of generators that are supplying energy at the points 2 and 3. In this instance, only two of the units of the wattmeters are shown connected but it may be assumed that at least one other generator is supplying energy at each of the points 2 and 3. However, it is not necessary that the various generators be connected in parallel to the same load circuits.

The movable members of the various units of the wattmeter 7 are connected together to actuate a movable contact member 9 that is adapted to engage stationary contact members 10 for the purpose of controlling the circuit of operating electromagnets 11 and 12. Thus, the movements of the wattmeter 7 are transmitted through a parallel-motion linkage mechanism 13 to a movable contact member 14. Similarly, the movable members of the various units of the wattmeter 8 are operatively connected together to actuate a movable contact member 15 that is adapted to engage stationary contact members 16 for the purpose of controlling the windings of electromagnets 17 and 18. Thus, the movements of the wattmeter 8 are transmitted through a parallel-motion linkage mechanism 19 to a movable contact member 20. The wattmeter 7 is provided with a variable resistor 21, and the wattmeter 8 is provided with a variable resistor 22. The resistors 21 and 22 are connected in closed-circuit relation with respect to a source 23 of electromotive force. The electromagnets 11 and 12 are supplied with energy from the source 23 of electromotive force and the electromagnets 17 and 18 are supplied with energy from a source 24 of electromotive force. While the meters 7 and 8 are shown as wattmeters, they may be volt-ampere meters or any other suitable type of meters, according to the results desired.

An electro-responsive device 25, such as a voltmeter, is operatively connected to conductors 26 and 27 that are connected to the contact members 14 and 20, respectively. Thus, when the contact members 14 and 20 are moved along the resistors 21 and 22, respectively, the potential across the contact members 14 and 20 will vary in accordance with the total power traversing the windings of the wattmeters 7 and 8, and, since the resistors are connected in series, the potential across the conductors 14 and 20 is proportional to the total power that is supplied at the points 2 and 3.

The electro-responsive device 25 may be of the well known Kelvin-balance type of meter and comprises movable and stationary windings 28 and 29, a movable contact member 30, stationary contact members 31, operating electromagnets 32 and 33 that are controlled by the contact members 30 and 31 and energized by a source $33^a$ of electromotive force. The movements of the movable member 28 are transmitted, through a parallel-motion linkage mechanism 34, to a movable contact member 35. The movable contact member 35 is adapted to engage stationary contact members 36 and 37 under predetermined conditions. The stationary contact member 36 is operatively connected to one terminal of an electromagnet 38, and the stationary contact member 37 is operatively connected to one terminal of the electromagnet 39. The remaining terminals of the electromagnets 38 and 39 are operatively connected together and to one terminal of the battery $33^a$. The other terminal of the battery $33^a$ is operatively connected to the movable contact member 35. When the contact members 35 and 36 are in engagement, the electromagnet 38 will be energized, and when the contact members 35 and 37 are in engagement, the electromagnet 39 will be energized. The movable core members 40 and 41 of the electromagnets 38 and 39 are connected through a toothed rack 42 that is adapted to engage a pinion 43 which is adapted to operate the valve 44 of a steam turbine 45. The turbine 45 is adapted to actuate a generator 46 to constitute the auxiliary source 4 of energy.

If the movable contact members 14 and 20 move to the position corresponding to the maximum demand to be supplied by the generators 5 and 6, sufficient energy will traverse the conductors 26 and 27 and, consequently, the windings of the electro-responsive device 25 to effect engagement between the contact members 35 and 36. Thus, the electromagnet 38 will be energized and the valve 44 of the steam turbine 45 will be opened a sufficient amount to permit the generator 46 to supply the energy in excess of the maximum demand that is permitted to be supplied at the points 2 and 3. However, when the movable contact members 14 and 20 are moved to such position that will cause the meter to indicate that less energy is being supplied at the points 2 and 3 than is desired, the movable contact member 35 will engage the stationary contact member 37 to energize the electromagnet 39 and, consequently, close the valve 44 of the turbine 45.

While I have illustrated the control of the turbine 45 as being obtained through a valve, it will, of course, be understood that it may be controlled through its governor, with equally good results, and it will further be understood that the movements of the movable contact member 35 may be used to indicate the total power that is supplied at the points 2 and 3. In view of this, I provide a scale 47 that is adapted to cooperate with the member 35 to indicate the total value of the energy.

My invention is not limited to means for totalizing the power supplied by two stations, as any number of stations may be used if some means is provided for producing a voltage proportional to the sum of the indications of the meters of the various stations.

In Fig. 2 of the drawings, the meters 48, 49 and 50 are adapted to vary the potential of the secondary windings of transformers 51, 52 and 53 in accordance with their indications. The secondary windings of the transformers are connected in series with an electro-responsive device 54 for the purpose of indicating the sum of the indications of the meters 48, 49 and 50.

My invention is not limited to the particular types of meters illustrated or to the means for obtaining a resultant voltage proportional to their total indications, as many modifications may be made therein without departing from the spirit and scope of my invention as set forth in the appended claims.

I claim as my invention:

1. A measuring system for summing a plurality of quantities comprising a plurality of resistors, means for establishing potential differences thereacross, movable contact members for effecting engagement with the respective resistors, means for actuating the respective contact members in accordance with the corresponding quantities being summed, and means connected between the contact members to be influenced in accordance with the potential difference between said contact members.

2. A power-indicating system for a plurality of sources of energy, comprising a plurality of conductors constituting a circuit, a source of electromotive force for said circuit, contact members associated with said sources of energy and controlled in accordance with the power of said sources to engage predetermined portions of the conductors of the said circuit, and electro-responsive means controlled in accordance with the potential difference between the contact members.

3. The combination with a circuit comprising two series-connected resistors and a source of electromotive force therefor, of a contact member for each of the resistors, means for changing the position of the contact members with respect to the resistors in accordance with quantities to be measured, and means connected to the contact members to be actuated in proportion to the potential difference thereacross.

4. In an electric circuit, the combination with a circuit comprising two series-connected resistors and a source of electromotive force therefor, of a contact member for each of the resistors, means actuated in proportion to predetermined load conditions in the electric circuit for actuating the contact members, and means connected to the contact members to be actuated in accordance with the potential difference thereacross.

5. A totalizing measuring instrument comprising two meters the indications of which are to be totalized, a resistor for each of the meters, a source of electromotive force, a contact member for each of the resistors adapted to be actuated by the meters, and an electro-responsive device operatively connected across the two contact members, the said resistors being connected in series with the said source of electromotive force.

6. A measuring instrument comprising two meters the sum of the readings of which is to be determined, a resistor for each of the meters, a battery, a contact member for each of the resistors, and a potential-responsive device operatively connected across the two contact members, the said resistors being connected in series with the said battery, and the said contact members being actuated by the said meters in accordance with their indications.

7. A measuring system comprising two electrical measuring instruments the sum of the indications of which is to be determined, a resistor for each of the instruments, a battery connected in circuit with the resistors, a contact member for each of the resistors adapted to be moved in accordance with the indications of the instrument, and a potential-responsive device connected directly to the two contact members.

8. A measuring system comprising two wattmeters the sum of the indications of which is to be determined, a resistor for each of the wattmeters, a battery adapted to be connected in closed-circuit relation with the resistors, a contact member for each of the resistors adapted to be moved in accordance with the indications of the wattmeters, and a voltmeter electrically connected directly to the two contact members.

9. The combination with a circuit comprising two series-connected resistors and means for impressing a voltage thereacross, of contact members for the resistors, means for actuating the contact members to include a potential difference between a contact member and a predetermined reference point of the associated resistor, that shall be a measure of an external force or quantity being measured, and means connected to the contact members for indicating the sum of the potential differences included between the contact members and the reference points.

10. The combination with a circuit comprising a plurality of constant potential means, of movable connectors for said means, means for varying the connection of the connectors to said means to obtain various differences of potential between the connectors and predetermined reference points of said means, and means connected to the connectors for indicating the sum of the differences in potential between the connectors and said reference points.

11. A measuring system for summing a plurality of quantities, comprising a closed circuit, means for energizing the circuit to maintain constant potential differences across predetermined portions thereof, means adapted to be subjected to the potentials of points within said predetermined portions and means energized by the potential difference between said means.

12. A measuring system for summing a plurality of quantities or forces, comprising a circuit including conductors energized to maintain a constant potential gradient therein, contact members for engaging portions of the conductors having a potential corresponding to the value of the associated quantity or force being measured and means energized in accordance with the potential difference between the contact members.

13. A measuring system for summing a plurality of quantities or forces, comprising a conductor having a definite predetermined potential gradient maintained therein, a plurality of contact members actuable in accordance with the values of the quantities or forces being measured to engage the conductor at a distance from a predetermined point between which arbitrary point and the point of contactive engagement the potential difference shall be a measure of the value of the corresponding quantity or force, and means for indicating the potential difference between the points of engagement of the contact members.

14. A measuring system for a plurality of quantities or forces, comprising a circuit containing conducting portions associated with said quantities or forces being measured, and across which definite predetermined potential differences are maintained, contact members associated with the respective portions and adapted to be actuated from predetermined points of the respective portions to engage said portions at points between which and the arbitrary points a potential difference is included varying in accordance with the value of the associated quantity or force, and means for controlling an external circuit in accordance with the value of the potential difference between the contact members.

15. A measuring system for summing a plurality of quantities or forces comprising a reference circuit having a predetermined potential gradient maintained therein, an indicating circuit containing electro-responsive means for indicating the potential difference between different points of the reference circuit and means for connecting the indicating circuit to points of the reference circuit between which the potential difference shall be a measure of the sum of the quantities or forces being measured.

16. A measuring system for summing a plurality of quantities or forces comprising a reference circuit having a predetermined potential gradient maintained therein, an indicating circuit containing electro-responsive means for indicating the potential difference between different points of the reference circuit, a plurality of movable contact members for connecting the indicating circuit to the reference circuit and means associated with the respective quantities or forces for controlling the movement of the contact members.

17. A measuring system for summing a plurality of quantities or forces comprising a reference circuit having a predetermined potential gradient maintained therein, an indicating circuit containing electro-responsive means, a plurality of movable contact members for connecting the indicating circuit across a portion of the reference circuit and means for controlling the contact members in accordance with the value of the associated quantities or forces.

18. A power-measuring system for summing the power of a plurality of sources of energy, comprising a plurality of electrically-energized means having constant predetermined potential differences respectively maintained thereacross, a movable contact member associated with each of said means, means for actuating each contact member relative to the associated means to include a potential difference between the contact member and a predetermined reference point of said means that shall be a measure of the power of the associated source of energy, an indicating device and means whereby said device is connected to the contact members to cause said device to be energized in accordance with the sum of the potential differences obtaining between the contact members and the reference points of the associated means.

In testimony whereof, I have hereunto subscribed my name this 26th day of May, 1916.

STEPHEN Q. HAYES.